Dec. 1, 1953   J. A. CHAMBERLIN   2,661,170
MEANS FOR CONTROLLING AIRCRAFT IN FLIGHT
Filed Feb. 11, 1950   2 Sheets-Sheet 1
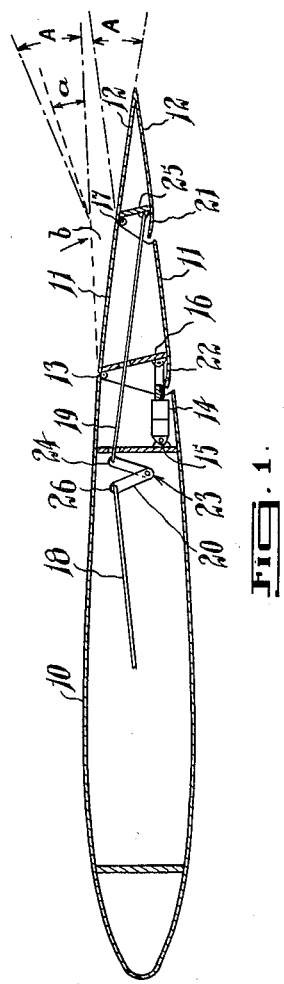
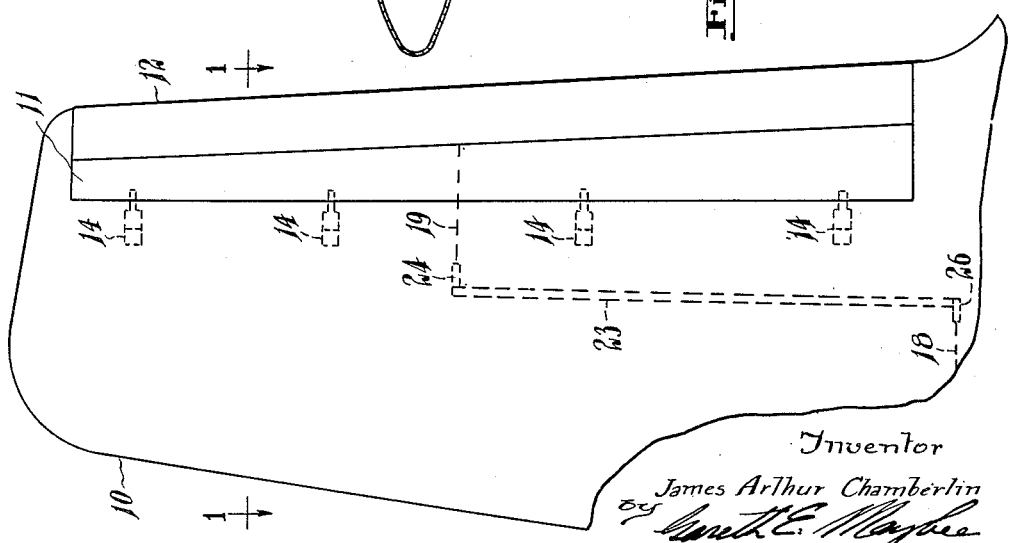
Inventor
James Arthur Chamberlin
ATTY.

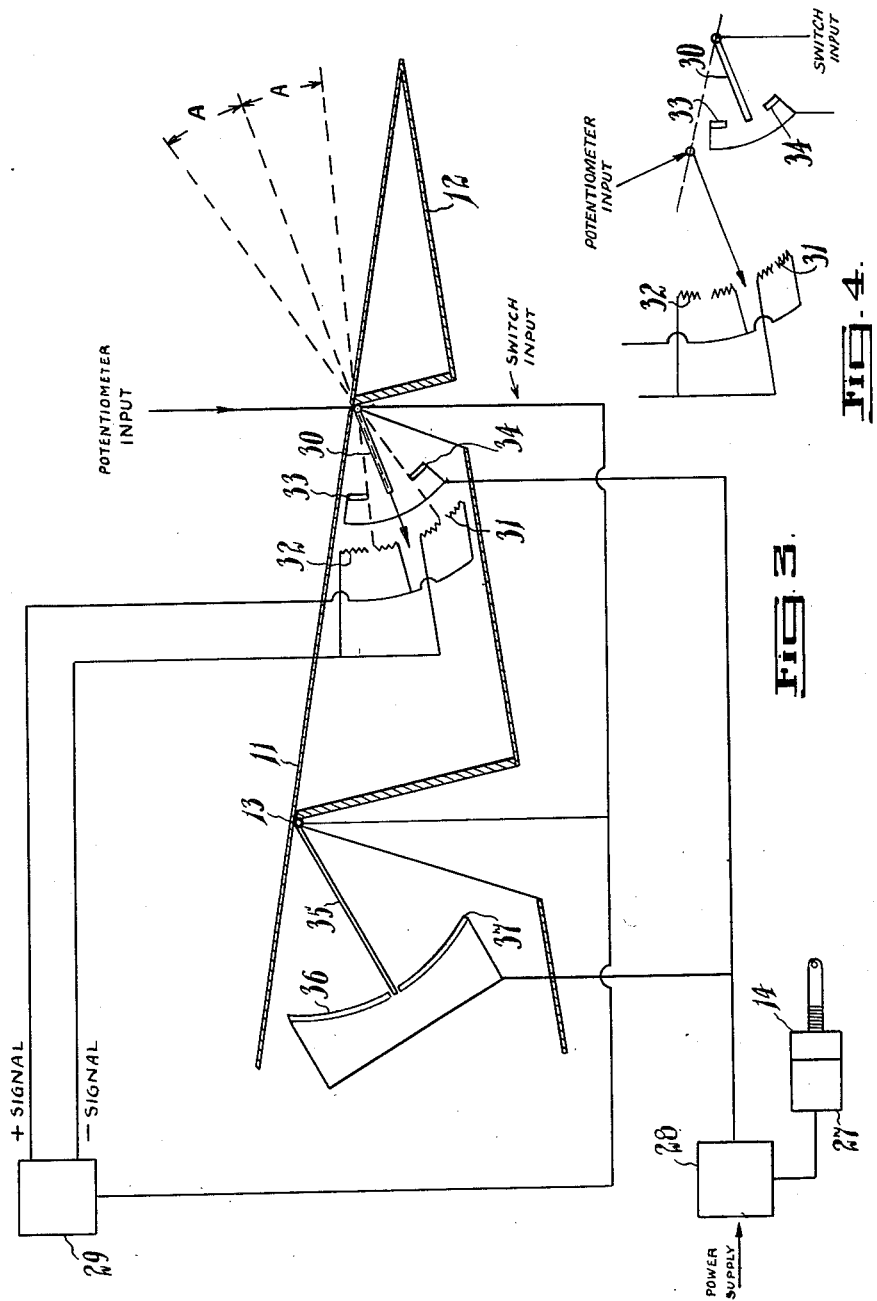

Patented Dec. 1, 1953

2,661,170

UNITED STATES PATENT OFFICE 2,661,170

MEANS FOR CONTROLLING AIRCRAFT IN FLIGHT

James Arthur Chamberlin, Toronto, Ontario, Canada, assignor to A. V. Roe Canada Limited, Malton, Ontario, Canada Application February 11, 1950, Serial No. 143,719

8 Claims. (Cl. 244—87)

This invention relates to improvements in means of controlling aircraft in flight.

The control of aircraft laterally, longitudinally and directionally is normally effected by the use of hinged surfaces trailing from fixed surfaces, such as the well-known combination of rudder and fin, and the pilot moves these hinged surfaces by means of cables, rods or other mechanisms connecting the said surfaces to the controls in the cockpit. In large aircraft the forces necessary to operate the controls at high speed would be beyond the strength of the average pilot, unless the mechanical advantage were so arranged as to render the controls insensitive, and therefore, to assist the pilot, each surface is aerodynamically balanced by the location of a portion of the surface forward of its hinge line; alternatively some aerodynamically operated servo-mechanism is provided. These devices have many shortcomings, and it is the object of this invention to provide a system of controls which is sensitive and effective while avoiding many of the weaknesses of the conventional balanced surface arrangement.

British Patent 574,151, dated January 8, 1944, and issued to Sir W. G. Armstrong Whithworth Aircraft Limited and John Lloyd discloses an aircraft rudder construction having a pair of flaps or moving surfaces mounted serially, the first being mounted in the conventional manner and the second being hinged along the trailing edge of the first. The first surface is operated by irreversible mechanical power means, while the second is controlled directly by the pilot's effort.

In the construction disclosed in the above mentioned patent the two flaps are independently actuated; there is no means to indicate when the power operated corrector flap should be actuated; nor to indicate when it has been actuated to the required extent. It is useful chiefly to correct a substantially permanent condition such as a completely disabled motor. It is not satisfactory for correcting a temporary condition as for instance for use in an elevator for landing or taking off. Because of its lack of mobility it may be actually dangerous in some cases. Moreover, the patented construction contemplates an undesirable condition in which one flap may be working against the other resulting in aerodynamic drag.

According to the present invention two or more flaps are hinged serially to one another, the most forward flap of the series being hinged to a fixed plane surface of the aircraft, and means is provided for controlling the flaps so that deflection thereof from the aerodynamically neutral position takes place progressively from the rearmost flap forwardly, each flap having a predetermined arc of deflection from the neutral position within which arc no deflecting force is exerted by the controlling means upon the flap immediately forward of said flap and beyond which arc the angular relationship between said flap and the flap immediately forward thereof remains substantially constant.

Thus the control of the aircraft is normally effected by the rearmost flap, said flap being preferably manually operated and partially massbalanced. When deflection beyond a predetermined maximum is required in one direction to maintain the aircraft on a predetermined course the adjacent flap will be deflected mechanically as, and to an extent proportional to, the deflection of the rearmost flap beyond a predetermined angle, so that whereas the total control moment will be increased, the relative angle of deflection between the two flaps will be substantially maintained at the predetermined maximum. Deflection of the rearward flap in the other direction will cause the adjacent flap to be deflected in the same direction, substantially maintaining the predetermined angle until it reaches a central or aerodynamically neutral position, at which point control of the aircraft is exercised solely by the rearward flap within the aforesaid predetermined angle of deflection.

In addition, in order to avoid flutter all moving surfaces of an aircraft must be carefully massbalanced. The balance weights provided for this purpose increase the tare weight of the aircraft and are often difficult to accommodate in thin components when the range of relative travel between the fixed and movable components is large. In this invention the total control surface area is of the same order as the area of the conventional control surface so that the chord of each of the two flaps is approximately half the chord of the conventional component; in fact the chord of the second flap may be substantially less than half. The first flap is controlled irreversibly by mechanical jacks and therefore requires no massbalancing at all; the second flap, which is manually operated and must be mass-balanced, requires a relatively small balance weight because of its narrow chord. On a large aircraft this saving in mass-balance weight may be an appreciable item.

Another disadvantage of the normal aerodynamic balance is that its hinge moment characteristics are seldom linear and consequently the force on the pilot's controls is deceptive and the force exerted by the pilot is not proportional to the force exerted on the control surfaces or to the resulting moment acting upon the aircraft. United States Patent 2,277,378, dated March 24, 1942, and issued to E. C. Wells teaches a construction of a power-assisted control system eliminating the aerodynamic balance and claiming to maintain to some extent the good "feel" of an unbalanced system. In the Wells construction, however, there is no direct connection, in all conditions, between the pilot's controls and the associated control surfaces; the system incorporates yieldable force-transmitting means, so that the air loads acting upon the control surfaces, at any given attitude of the pilot's controls, will not vary proportionately with the speed of flight and therefore the "feel" will not be truly representative of the forces acting upon the aircraft. By the invention described herein this weakness is avoided and the linear characteristics and good "feel" of the unbalanced system are made available to large aircraft without requiring the application of super-human forces by the pilot in some circumstances of extreme travel.

Yet a further object of this invention is to provide a means of increasing the permissible range of centre of gravity of the aircraft. In the foregoing paragraphs the various shortcomings of the aerodynamically balanced control system have been described, and moreover an indication has been given of how this invention will perform the same functions without suffering from these disadvantages.

However, when used on elevators, it must be said in fairness to the aerodynamically balanced surface that it has some advantages over the equivalent unbalanced component in regard to centre of gravity considerations. Those skilled in the art will understand the significance of the so called stick free and stick fixed neutral points and appreciate that with an aerodynamically balanced elevator the stick free neutral point may be not only as far aft as the stick fixed neutral point but sometimes even farther aft, whereas with an unbalanced elevator the stick free neutral point will be always farther forward than the stick fixed neutral point. The aft limit of the centre of gravity range must be coincident with the most forward of the neutral points. By virtue of the narrow chord of the manually operated flap this invention provides a very small difference between the stick free and stick fixed neutral points and thus gives a relatively large centre of gravity range without the help of aerodynamic balances with their attendant disadvantages which have already been described.

As regards the power operation of the first flap, it is usually a statutory requirement that the operating mechanism of all power operated controls should be duplicated as a precaution against failure, but in this invention where a power operated flap is associated with a manually operated flap, such duplication is not required, since the aircraft can be flown without the power system if necessary. Therefore in comparison with other power operated controls, a considerable savings in weight is achieved and, in addition, less reliance need be placed upon the mechanical infallibility of the mechanism, and damage to the system resulting from enemy action will not normally render the aircraft uncontrollable. A further saving in weight is derived from the fact that in normal operation, power is applied intermittently and, therefore, the power units may be designed to meet peak loads of short duration.

In brief the principal object of this invention is to provide a control surface in which manual operation and power operation can be combined so that the desirable characteristics of both methods of operation may be obtained without many of the disadvantages normally associated with the use of either system. This is achieved by virtue of the fact that the manually operated flap, in spite of its small chord, has an aerodynamic effectiveness which is a large fraction of the effectiveness of the two flaps acting together, making it possible to control the aircraft with the manually operated flap only under most normal conditions. Other objects and advantages of the invention will be apparent during the course of the following description.

In the accompanying drawings forming a part of this application and in which like numerals are employed to designate like parts throughout the same, Fig. 1 is a diagrammatic horizontal section of a typical fin and rudder on the line 1—1 in Fig. 2, but on approximately twice the scale of Fig. 2, showing the layout of the flaps, the power operated jacks, and the manual controls;

Fig. 2 is a diagrammatic side elevation of the fin and rudder embodying the invention; and Fig. 3 is a diagram showing the application of power to the controls, in accordance with a signal from the potentiometer under the control of a switching arrangement; and Fig. 4 is an exploded diagrammatic view of the switching arrangement.

To simplify the description the case of a vertical fin and rudder of an aircraft will be considered, but it will be understood that the invention can be applied equally well to other control surfaces such as tail planes and elevators. In Fig. 1 the numeral 10 designates a fin carrying a rudder comprising two serially hinged flaps 11 and 12.

The first flap 11 is hinged to the fin by a piano hinge 13 and is operated by a jack 14 which is pivotally mounted on the fin 10 and the flap 11 respectively at points 15 and 16. The second flap 12 is mounted by a piano hinge 17 on the first flap and is controlled through rods 18 and 19 and bell-crank 20 which will be described later. Sliding fairings 21 and 22 are provided to close the gaps between the various components when the rudder is deflected about one or both of the piano hinges 13 and 17. The dotted lines on Fig. 1 show a typical deflected position of the rudder, and letters $a$ and $b$ depict the angle of deflection of the flap 12 relative to the flap 11 and of the flap 11 relative to the fin 10 respectively. The dot-dash lines depict a predetermined angle A.

The means of operating the flap 12 comprises the commonly used series of rods and bell-cranks extending between the pilot's rudder bar and the flap. These include rods 18 and 19 and bell-crank 20, shown in Fig. 1. The bell-crank is pivoted about point 23 and the rod 19 is attached to the bell-crank 20 and the flap 12 at points 24 and 25 respectively. The rod 18 is attached to the bell-crank at point 26. The dimensions of the bell-crank 20 and of the rod 19 and the location of the point 23 are so chosen in relation to the position of the hinges 13 and 17 that there is in effect a change of gearing between the movement of the pilot's rudder bar and the movement of the flap 12 which occurs when the flap 11 begins to move, as will be described later.

It will be seen from Fig. 2 that the power operated jacks 14 are applied at intervals all along the length of the flap 11. It has been found that using this multiplicity of jacks results in a lighter structure than using one or two jacks, which would necessitate heavy stiffening of the structure of the flap to give torsional rigidity. Each jack is driven by a small electric servo-motor 27 having a high ratio of torque to rotary inertia to give good response characteristics. Since, as will be explained later, the operation of these servo-motors is intermittent, it is possible to rate them more highly than would be permissible for constant operation and by this means considerable weight saving can be effected.

Fig. 3 illustrates how power is supplied to the servomotors 27 through an amplifier 28 which is controlled by a signal measuring device 29. It will be explained later that as the angle $a$ varies about a predetermined value A, the power is controlled in accordance with the magnitude of the angles $a-A$ (i. e. $a$ minus A) which will be referred to as signal angles. (For positive values of $a$, A is positive and for negative values of $a$, A is negative. Herein only the positive case will be considered, since the negative is a mirror image.) It will be understood that there are many effective methods whereby signals proportional to the signal angles may be transmitted to the signal measuring device 29, but Fig. 3 illustrates diagrammatically an elementary means for achieving this result. Rigidly attached to the flap 12 is an arm 30 capable of moving over potentiometers 31 and 32 which are mounted on the flap 11. Each potentiometer has a neutral central position which is spaced at an arc $+A$ to $-A$ from the corresponding position of the other potentiometer: the potentiometer 31 measures the signal angle for positive values of $a$ and the potentiometer 32 measures the signal angle for negative values thereof. The said potentiometer system is so arranged that the signal therefrom increases progressively with the signal angle on both sides of the angle A, (either $+A$ or $-A$), from zero to a maximum value and is transmitted accordingly to the signal measuring device 29. To overcome errors due to phase lag resulting from rapid accelerations of the flap 12 the signal measuring device 29 advantageously embodies a derivative network of resistors, reactors, and condensers, the output from which is amplified by means of saturated reactors in the amplifier unit 28 to control the servo-motors 27.

In addition to the potentiometer system between the flaps 11 and 12, the two flaps are connected to make-and-break switches in the signal circuit which are also shown diagrammatically in Figs. 3 and 4. The arm 30 on the flap 12 may be regarded as serving in combination as a potentiometer arm, as hereinbefore described, and as a switch arm moving between and over contacts 33 and 34 which are spaced at an arc $+A$ to $-A$ from one another. The two arms are, of course, insulated from one another, the potentiometer arm being connected to the potentiometer in put and the switch arm being connected to the signal measuring device 29, through line marked "switch input" in Figure 3. The flap 11 carries a similar switch arm 35 moving between and over contacts 36 and 37, which have a relatively small break arc between them. In the case of a rudder, each switch comprises an arm and two contacts to control travel in both directions, as previously described, but in the case of an elevator, contacts are required only in one sense to prevent down travel of the power operated flap. The switches are wired as shown in the diagram and the assembly is inserted between the signal measuring device 29 and the amplifier 28, so that, in effect, no current can flow from the signal measuring device to the amplifier when the flap 11 is substantially centrally located relative to the fin 10, unless the flap 12 is deflected so that it lies outside the arc $+A$ to $-A$ relative to the flap 11. On the other hand the current can flow from the signal measuring device 29 to the amplifier 28, through the switch arm 35 and one of the contacts 36 and 37, if the flap 11 is displaced from the central position relative to the fin 10, though the flap 12 may be within the arc $+A$ to $-A$ relative to the flap 11.

The limits of relative movement between the flaps 11 and 12 are set by stops corresponding to the outer ends of the contact strips 33 and 34: in other words the length of each of these contact strips is such that it subtends an angle, equal to the angle of maximum signal, at the centre of rotation of the arm 30.

The operation of the control is, of course, originated by the pilot who exerts pressure on the rudder bar, and the displacement caused thereby is transmitted through the rods 18 and 19 and the bell-crank 20 to the flap 12 which is sometimes referred to herein as the manually operated flap, although it will be understood that this expression may include robot control. This flap is deflected without any movement of the flap 11 until the deflection reaches the angle A, i. e. until the angle $a$ attains this figure. At this point the arm 30 makes contact with the strip 33 or 34 and thereafter any signal from the potentiometer may be transmitted through the signal measuring device 29 and the amplifier 28 to the jack servo-motors 27. If the pilot continues to move his control, the angle $a$ will exceed the predetermined angle A, and a signal proportional to the signal angle, that is to the difference between the angle $a$ and the predetermined angle A, will be transmitted to the actuating system causing the servo-motors 27 to extend or retract the jacks 14 at a speed and in a sense, proportional to the signal. By virtue of the potentiometer control, acceleration of the actuating system will be smooth and progressive. If the pilot continues to move his rudder bar as fast as the power operated flap 11 is capable of moving, under the influence of a signal of some specific value, the appropriate signal angle will be maintained and the flap 11 will continue to move. However, it will be seen that motion of the power operated flap 11 without a corresponding motion of the pilot, causes the signal angle to be reduced, and when the pilot either reduces the speed of his control movement or stops it altogether, the flap 11 will continue to move at a progressively decreasing speed until the signal angle is reduced to zero, and the angle $a$ equals the angle A. At this point power operation ceases, leaving the flap 11 in a new position.

To move the control surfaces back from the said new position towards the aerodynamically neutral position, the pilot moves his rudder bar in the reverse direction, reducing the angle between the flap 12 and the flap 11 and transmitting an appropriate signal from the potentiometers to the signal measuring device 29. Although in this condition the switch arm 30 is out of contact with either of the contacts 33 and 34, the signal can be transmitted from the signal measuring device 29 to the amplifier 28 through the switch arm 35 and one of the contacts 36 and 37, so long as the flap 11 is displaced from the central position.

The speed of operation of the power system is such that normally the pilot will be unable to move the flap 12 in relation to flap 11 sufficiently quickly to attain the angle of maximum signal in either direction or, in the outward direction, to bring the said flap 12 against the stops at the outer ends of contact strips 33 and 34.

The magnitude of the angle of maximum signal, that is the value of $a-A$ above which the signal, as amplified and transmitted to the servo-motors, is not increased, has an important bearing on the operation of the system. When this angle of maximum signal is small, after passing the angle A the manually operated flap 12 can exert a very small control moment on the aircraft and in effect the motion of the power operated flap 11 is controlled more or less directly by the pilot. Accordingly the response characteristics of the power system must be adequate to meet his maximum requirements. On the other hand if the angle of maximum signal is made large, a considerable control moment may be exerted by the manually operated flap 12 after exceeding the angle A and if the motion imparted by the pilot to the flap 12 is faster than can be followed by the power system, he will possess the ability to apply small corrective moments at rates which exceed the response capabilities of the power system. This may be a valuable characteristic in elevator systems during such operations as landing an aircraft.

A mention has already been made of the fact that the dimensions of the system of rods 18 and 19 and bell-crank 20 are so chosen that there is a change in proportion between the movement of the pilot's control and the manually operated flap 12 which takes place in the neighbourhood of the point where the power control comes into operation, that is at the point where the angle $a$ equals the angle A, when the angle $b$ is zero. At this point the rate of change of hinge moment with respect to deflection of the flap 12 may change due to the effect of the power operated flap 11, and the differential control linkage must be provided so that at all times the pilot will feel a load on the manual system proportional to the movement of the controls in the cockpit regardless of the deflection of the power operated flap.

The purpose of the make-and-break switches, shown in Fig. 3, will be understood when considering the nature of the control exercised by the manually operated flap 12 on the power system. At any given position and in any one direction the angle $b$ increases at a speed proportional to the amount by which the angle $a$ exceeds the predetermined angle A and decreases at a speed proportional to the amount by which the angle $a$ is less than the predetermined angle A. In other words when the signal angle is positive or negative, a positive or negative signal respectively is transmitted to the power system. Of course the condition must not occur when the flap 11 is in the neutral position i. e. when the angle $b$ is zero, otherwise for a positive deflection of the manual flap within the angle A a negative signal will be transmitted to the power system, tending to move the power operated flap 11 in the opposite direction i. e. tending to give a negative value to the angle $b$. Thus when the angle $b$ is zero, the manually operated flap 12 must be free to move over the arc $+A$ to $-A$ without transmitting any signal to the power system: this is achieved by the simultaneous opening of the switches shown in Fig. 3, since when the angle $b$ is zero the switch arm 35 is situated in the break between the contacts 36 and 37 and when the angle $a$ is less than the angle A the switch arm 30 is situated within the arc $+A$ to $-A$ between the contacts 33 and 34.

In practice, provided that the chord of the manually operated flap 12 is approximately half the chord of the conventional single-flap rudder, the power operated flap 11 will be called upon very rarely and, except in such circumstances as may occur due to the failure of an outboard engine on a multi-engined aircraft, the manually operated flap 12 will provide sufficient control in all conditions of flight. Similarly, when the invention is applied to an elevator, the power operated flap will normally be used only for landing, and in other conditions the manually operated flap will be sufficient. For this reason, as has been stated already, the servo-motors 27 will not be required to meet long periods of operation and may be highly rated for intermittent duty.

A rudder and fin combination has been described but this is not to be regarded as restrictive and in fact some of the greatest benefits from the invention may be obtained in its application to elevators. It is therefore to be understood that the form of the invention herewith shown and described, is to be taken as a typical example of the same and that various changes in the shape, size and arrangement of the various parts may be adopted without departing from the scope of the subjoined claims.

What I claim as my invention:

1. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, and means in the circuit for collecting the signal and transmitting same to the means for actuating the power operated flap.

2. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap, and the said predetermined angle, and means in the circuit for collecting the signal and transmitting same to the means for actuating the power operated flap, the potentiometer having a neutral position from which the signal increases progressively and in opposite senses as the potentiometer arm moves in opposite directions from the neutral position.

3. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, and means in the circuit for collecting the signal and transmitting same to the means for actuating the power operated flap, the potentiometer system including two potentiometers, one of which creates the signal when the said one flap is moved to one side of its aerodynamically neutral position and the other of which creates the signal when the said one flap is moved to the other side of its aerodynamically neutral position.

4. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, means in the circuit for collecting the signal and transmitting same to the means for actuating the power operated flap, and a switch in the said circuit controlled by the power operated flap and adapted to be closed when the power operated flap is deflected from its substantially aerodynamically neutral position and adapted to be opened when the power operated flap is in its substantially aerodynamically neutral position.

5. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, and means in the circuit for collecting the signal and transmitting same to the means for actuating the power operated flap, the potentiometer system including two potentiometers, one of which creates the signal when the said one flap is moved to one side of its aerodynamically neutral position and the other of which creates the signal when the said one flap is moved to the other side of its aerodynamically neutral position, each potentiometer having a neutral position from which the signal increases progressively and in opposite senses as the potentiometer arm moves in opposite directions from the neutral position.

6. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, means in the circuit for collecting the signal and transmitting same to the means for actuating the power operated flap, and a switch in the said circuit controlled by the power operated flap and adapted to be closed when the power operated flap is deflected from its substantially aerodynamically neutral position and adapted to be opened when the power operated flap is in its substantially aerodynamically neutral position, the potentiometer having a neutral position from which the signal increases progressively and in opposite senses as the potentiometer arm moves in opposite directions from the neutral position.

7. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, means in the circuit for collecting the signal and transmitting same to the means for actuating the power operated flap, and a switch in the said circuit controlled by the power operated flap and adapted to be closed when the power operated flap is deflected from its substantially aerodynamically neutral position and adapted to be opened when the power operated flap is in its substantially aerodynamically neutral position, the potentiometer system including two potentiometers, one of which creates the signal when the said one flap is moved to one side of its aerodynamically neutral position and the other of which creates the signal when the said one flap is moved to the other side of its aerodynamically neutral position.

8. Flight control means for an aircraft comprising a fixed plane surface, a plurality of flaps hinged serially to one another, the most forward flap of the series being hinged to the fixed plane surface, and means for controlling the flaps so that deflection thereof from the aerodynamically neutral position takes place successively from the rearmost flap forwardly, said means including means for deflecting one flap, power operated means for deflecting the flap immediately forward of said one flap, means for actuating the power operated means, an electric circuit, a normally open switch in the circuit adapted to be closed when the said one flap is deflected beyond a predetermined angle relative to said power operated flap, a potentiometer system in the circuit energized when the switch is closed and including a potentiometer having a potentiometer arm movable proportionally to the relative movement between said one flap and the power operated flap for creating an electrical signal proportional to, and in the same sense as, the difference between the angle of deflection of the said one flap and the said predetermined angle, means in the circuit for collecting the signal and transmitting same to the means for actuating the power operated flap, and a switch in the said circuit controlled by the power operated flap and adapted to be closed when the power operated flap is deflected from its substantially aerodynamically neutral position and adapted to be opened when the power operated flap is in its substantially aerodynamically neutral position, the potentiometer system including two potentiometers, one of which creates the signal when the said one flap is moved to one side of its aerodynamically neutral position and the other of which creates the signal when the said one flap is moved to the other side of its aerodynamically neutral position, and each potentiometer having a neutral position from which the signal increases progressively and in opposite senses as the potentiometer arm moves in opposite directions from the neutral position.

JAMES ARTHUR CHAMBERLIN.

References Cited in the file of this patent

UNITED STATES PATENTS

| Number | Name | Date |
|---|---|---|
| 2,120,717 | Sikorsky | June 14, 1938 |
| 2,183,279 | McCarty et al. | Dec. 12, 1939 |
| 2,277,378 | Wells | Mar. 24, 1942 |
| 2,379,999 | Tydon et al. | July 10, 1945 |
| 2,395,671 | Kleinhans et al. | Feb. 26, 1946 |
| 2,431,529 | Wendt | Nov. 25, 1947 |

FOREIGN PATENTS

| Number | Country | Date |
|---|---|---|
| 402,941 | Great Britain | Dec. 14, 1933 |
| 573,084 | Great Britain | Nov. 6, 1945 |
| 574,151 | Great Britain | Dec. 21, 1945 |